United States Patent

Kunda et al.

[11] Patent Number: 5,570,376
[45] Date of Patent: Oct. 29, 1996

[54] METHOD AND APPARATUS FOR IDENTIFYING FAULTS WITHIN A SYSTEM

[75] Inventors: Ramachandra P. Kunda, Milpitas; Adam C. Malamy, Palo Alto; Marc Levitt, Sunnyvale, all of Calif.

[73] Assignee: Sun Microsystems, Inc., Mountain View, Calif.

[21] Appl. No.: 318,378

[22] Filed: Oct. 5, 1994

[51] Int. Cl.⁶ .................................................. G06F 11/22
[52] U.S. Cl. ........................ 371/25.1; 371/28; 371/67.1
[58] Field of Search .................................. 371/25.1, 15.1, 371/22.5, 23; 364/551.01, 184, 488, 489, 578, 570; 324/73 R

[56] References Cited

U.S. PATENT DOCUMENTS

| | | | |
|---|---|---|---|
| 4,228,537 | 10/1980 | Henckels et al. | 371/23 |
| 5,293,323 | 3/1994 | Doskocil et al. | 364/551.01 |
| 5,325,309 | 6/1994 | Halaviati et al. | 364/488 |
| 5,377,197 | 12/1994 | Patel et al. | 371/23 |
| 5,418,792 | 5/1995 | Maamari | 371/23 |

OTHER PUBLICATIONS

Test Generation By Fault Sampling; Agrawal et al; 1988 IEEE.

*Primary Examiner*—Robert W. Beausoliel, Jr.
*Assistant Examiner*—Nadeem Iqbal
*Attorney, Agent, or Firm*—Blakely Sokoloff Taylor & Zafman

[57] ABSTRACT

Lists of candidate faults within an integrated circuit are generated, for the purpose of fault diagnosis, by performing a partial intersection of fault lists output from a full-scan test such as a JTAG test. The fault lists represent all candidate faults which may be responsible for producing a mismatched bit between an output test vector and an expected test vector provided by the full-scan test. The partial intersection is performed by first determining the number of occurrences of each candidate fault within all lists associated with each mismatched bit. Then, only faults which occur at least a pre-selected number of times are selected. In this manner, lists of candidate faulty gates are generated based on the relative degree of intersection between fault sets. The lists of candidate faulty gates are input to an X-Y location tool which determines the physical location on the integrated circuit of each of the candidate faulty gates to facilitate the efficient examination of each of the candidate faulty gates by test personnel.

30 Claims, 5 Drawing Sheets

METHOD AND APPARATUS FOR IDENTIFYING FAULTS WITHIN A SYSTEM

BACKGROUND OF THE INVENTION

1. Field of the Invention

The invention generally relates to system testing and in particular to a method and apparatus for identifying faulty gates within an integrated circuit.

2. Description of Related Art

It is often necessary to identify and locate faults occurring within a digital system such as an integrated circuit. The identification of faults within a digital system, herein refer to as fault diagnosis, is commonly employed during design debug, manufacturing tests, failure analysis, and depot repair. Typically, fault diagnosis is performed by applying a known stimulus to the input of the system, then comparing an observed output response with a predetermined expected response. Any mismatch between the observed and expected response may be an indication of a failure within the system. If such a mismatch occurs, it is desirable to identify the faulty elements of the system which are responsible for the mismatch between the observed and the expected response.

Conventional techniques for generating test stimulus will now be described, then techniques for correlating mismatches between observed and expected stimulus responses with candidate faulty system elements will be discussed.

One standard method for generating and processing test stimulus is an industry standard chip testing protocol known as JTAG and internal scan. The JTAG protocol, sponsored by the IEEE, defines a 5-pin serial interface to a VLSI chip that allows certain operations to be performed on the chip outside of normal operations.

An example of a test employing the JTAG protocol is as follows. An input vector (defined by a series of one's (1's) and zeros (0's) equal in length to the total number of flip flops and latches in an internal scan chain in the integrated circuit under test) is shifted into the integrated circuit through a JTAG input port. The input vector defines the internal state of the integrated circuit. Next, the circuit is switched from a test mode to a normal operating mode and run for one clock cycle. At the end of the cycle, many of the internal flip flops and latches are updated with new values due to normal operations of the integrated circuit. The integrated circuit is then switched back to the test mode and the values of the flip flops and latches are shifted out through the JTAG port. The bits of the test vectors shifted out are compared against a previously determined expected value and, if any mismatches occur, the circuit is thereby identified as being non-functional.

In this manner, the JTAG protocol allows one to determine whether an integrated circuit is functional or non-functional. However, as noted above, it is often desirable to further identify the source of the non-functionality, i.e., to identify actual faulty gates such as faulty flip flops, latches etc.

A number of techniques have been developed for performing fault diagnosis to identify faulty gates responsible for a mismatch between observed and expected test vector outputs. One such technique, a "union" method, provides, for each respective bit of the output test vector, a list of all gates which may be responsible for any mismatch of the respective bit.

Figure 1:
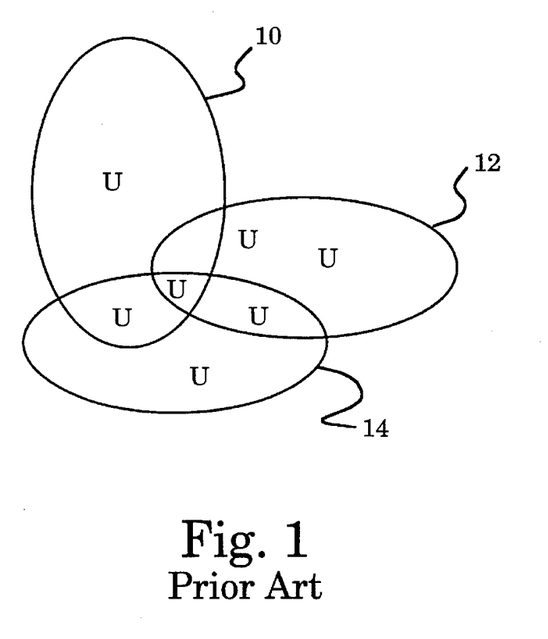
FIG. 1 is a symbolic representation of sets of candidate faults illustrating the conventional union method of fault diagnosis.

FIG. 1 illustrates the union method of fault diagnosis. In FIG. 1, three fault sets 10,12 and 14 are illustrated. Each set of faults represents all candidate faults associated with a mismatched bit of a test vector. For example, if a test vector includes one hundred bits and the 14th, 32nd and 87th bits of the output test vector do not match corresponding bits of an expected test vector, then sets 10, 12 and 14 may respectively denote all faults which could be responsible for the mismatched bits. Within FIG. 1, a U is illustrated within each portion of each set indicating the union.

A list of candidate faulty gates is generated based on all mismatched bits within a test vector or within sets of test vectors. A candidate faulty gate is a gate which may be responsible for a fault in the system but which has not yet been determined to be actually faulty. However, the number of faulty gates identified may be prohibitively large. For example, to adequately test a complex integrated circuit having thousands of gates, a large number of test vectors may be required, each having hundreds or thousands of individual bits. A comprehensive list of all gates associated with all mismatched bits within all test vectors may be prohibitively large and may, in fact, include each and every gate within the integrated circuit.

Accordingly, alternative techniques have been developed for refining the comprehensive union-based list to achieve a shorter list providing for more likely faulty gate candidates. In one such alternative technique, the "intersection" method, only faulty gates which are associated with every mismatched bit of every test vector are selected. The intersection method is effective in narrowing the list of candidate faulty gates to those which are more likely to represent the actual fault. However, the intersection method yields a null list when there are no faults in common with all the mismatch bits of all of the test vectors.

Figure 2:
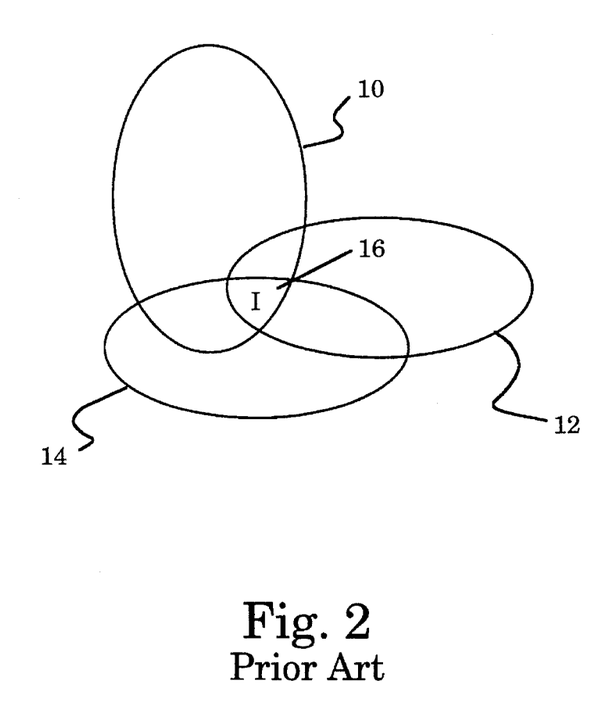
FIG. 2 is a symbolic representation of sets of candidate faults illustrating the conventional intersection method of fault diagnosis.

FIG. 2 illustrates the intersection method of fault diagnosis. In FIG. 2, the same three sets of candidate faults, 10,12 and 14 are illustrated. The intersection of fault sets 10,12 and 14 is labeled I and denoted by reference numeral 16. Only those faults within the intersecting region are identified as being candidate faults. Other candidate faults which are not common to all three fault sets are not selected. The intersection method would not identify the actual fault if it is one of lesser likelihood. Furthermore, as noted above, in circumstances where there are no faults common to all fault sets, then the intersection method yields only a null set and thereby provides no useful information regarding the identification of the actual fault As can be appreciated, practical fault diagnosis is difficult or impossible if the resulting list of candidate faults either encompasses each and every gate within the integrated circuit or includes no gates whatsoever. It would be desirable to provide an improved method and apparatus for performing fault diagnosis which has a greater likelihood of yielding a useful list of candidate faults than can be achieved with the conventional union or intersection methods. In particular, it would be desirable to provide a method of fault diagnosis which produces a small, but non-null, list of likely faults. Certain aspects of the present invention are drawn to such an improved method.

Another possible drawback with conventional fault diagnosis procedures is that it is often difficult to locate the actual gates within the integrated circuit which correspond to the candidate faulty gates provided by the fault diagnosis. To determine whether any particular gate may be faulty, it is often necessary to visually observe the gate, perhaps using a microscope or similar magnifying device, to determine if a physical defect has occurred within the gate. To observe the actual gate, it is first necessary to determine the physical location within the die or chip containing integrated circuit.

Heretofore, no effective tool has been developed for correlating a list of candidate faulty gates produced by fault diagnosis with the actual locations within a die containing integrated circuits. Rather, test personnel are typically required to compare the list of candidate faulty gates with circuit schematics illustrating the integrated circuit to determine the location of the faults. Typically, only those engineers who are highly familiar with the design of the particular integrated circuit being tested are capable of determining the physical location of gates based upon a faulty gate list and such an analysis is usually time-consuming. Furthermore, it is often difficult to find engineers who are highly familiar with the design of the integrated circuit, particularly a year or more after the design has been completed.

Accordingly, it would be desirable to provide a more efficient method for identifying the physical location of a candidate faulty gate within an integrated circuit based on faulty gate candidates developed during a JTAG, or similar, test. It is to that end that a second aspect of the present invention is drawn.

SUMMARY OF THE INVENTION

The invention is drawn to methods and apparatus for performing fault diagnosis in systems such as integrated circuits and the like. In accordance with one aspect of the invention, a method is provided for identifying elements of a faulty system, that are likely to contain faults, based on a set of test vectors output from the system wherein each vector contains a set of test values, some of which are identified as faulty values and wherein a list of candidate faulty elements are associated with each faulty value. The method involves the identification of elements likely to contain faults by employing a "partial intersection" on the fault lists of the faulty values wherein only elements having a selected degree of intersection are identified and wherein at least one candidate faulty element or group of faulty elements, is always identified.

In accordance with the partial intersection method, sets of candidate faulty elements are determined by first selecting a threshold fault count which identifies a threshold degree of intersection between the fault lists. Then, a fault count is determined for each candidate faulty element. The fault count is representative of the number of occurrences of each respective faulty element within all sets of candidate faulty elements associated with all faulty values. Thereafter, all elements which have a fault count greater than the selected threshold fault count are identified as the elements likely to contain faults. The threshold fault count is implemented to identify the bit intersection threshold in relation to the fault count having the greatest degree of intersection. In this manner, the partial intersection method always identifies at least one candidate faulty element group. In one embodiment, the faulty values are individual bits of the test vectors and the elements of the system are logic gates. The method is particularly suited toward testing systems which include integrated circuits having a large number of logic gates.

By employing the partial intersection method of identifying candidate faulty system elements, wherein only those elements having a selected degree of intersection are identified, problems associated with the conventional union or intersection fault diagnosis methods are avoided. In particular, by selecting an appropriate threshold, a list of candidate faulty values may be generated which is less than the number generated using the union method but greater than the number generated using the intersection method. This is particularly desirable in circumstances where the union method results in a prohibitively large list of candidate faulty elements but where the intersection method results in a null list. With the partial intersection method, the threshold may be first selected to yield a relatively small number of elements which are the most likely to be faulty. After examination of those elements, if it is determined that none of the elements are faulty, the threshold may be reset to select a greater number of candidate faulty elements, which are then also checked for faults. In this manner, only those elements which are most likely to contain the faults are initially examined. In accordance with one embodiment of the invention, a list of all of the candidate faulty elements may be generated, in a manner similar to the union method, but ordered in accordance with fault likelihood. This is achieved by performing the partial intersection fault diagnosis method iteratively while changing the threshold value to vary from a full intersection threshold to a full union threshold. As can be appreciated, a wide variety of methods and apparatus employing the principles of the partial intersection technique may be developed. Only exemplary embodiments are described herein.

In accordance with another aspect of the invention, for systems including integrated circuits formed on a chip or die, a list of candidate faulty system elements generated during fault diagnosis is processed by a physical chip location identification tool which translates the identification of candidate faulty gates into X-Y coordinates identifying the physical locations of the candidate faulty gates within the die or chip.

The second aspect of the invention may be employed either in connection with the partial intersection method discussed above, or with other fault diagnosis methods which yield lists of candidate faulty gates. By translating the identification of a candidate faulty gate with its actual physical location on an integrated circuit chip or die, the candidate faulty gates may be easily examined, perhaps using a microscope or similar device, for evidence of a physical defect. In certain embodiments, it may be desirable to employ the X-Y coordinates output from the location identification tool for directly controlling an optical device to quickly locate and image the candidate fault gates.

In this manner, laborious methods of the prior art wherein the location of a candidate faulty gate was determined by consulting complicated circuit schematics, usually with the cooperation of members of the design team responsible for designing the circuit, are greatly simplified. Indeed, because the physical location of a candidate faulty gate is identified without reference to circuit schematics or functional failure modes, fault diagnosis may be performed in many cases without requiring the knowledge of members of the original design team. As such, the method of the invention is ideally suited for fault diagnosis of integrated circuits and the like during any stage of the life cycle of a digital system including design, debug, manufacturing, test, failure analysis and depot repair.

Hence, the general objectives of the invention set forth above are achieved. Other objectives and advantages of the invention will be apparent from the detailed description of the invention provided herein,

DETAILED DESCRIPTION OF THE INVENTION

Referring to the remaining figures, the fault diagnosis system of the invention will be described. Initially, the partial intersection method will be generally described with reference to the symbolic fault set illustration of FIG. 3, then particular embodiments of systems implementing the partial intersection method will be described with respect to FIGS. 4–6. The method of determining the physical locations of faulty system elements within a chip or die will also be described within reference to FIG. 4–6.

Figure 3:
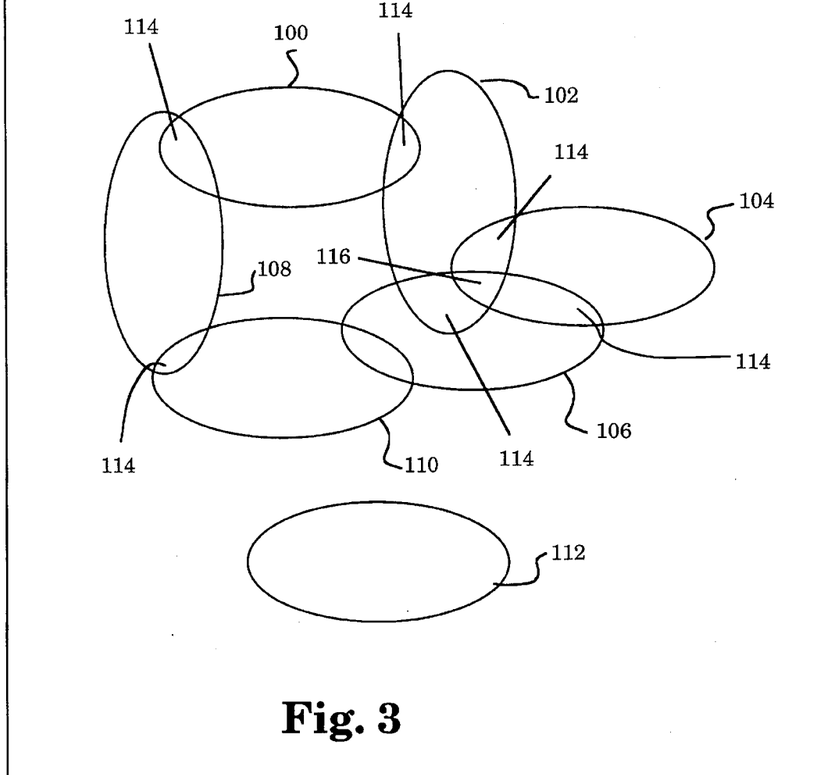
FIG. 3 is a symbolic illustration of sets of candidate faults illustrating the partial intersection method of fault diagnosis of the invention.

FIG. 3 illustrates seven fault sets 100–112, wherein each represent all possible candidate faults associated with a respective mismatched bit of test vector output from an integrated circuit using, for example, the JTAG protocol. All sets, other than set 112, intersect with at least one other set. Sets 102, 104 and 106 mutually intersect. In FIG. 3, set intersections between two sets are identified by reference numeral 114. The mutual intersection between sets 102, 104 and 106 is represented by reference number 116. In general, candidate faults within intersecting region 116 represent the most likely candidates of the actual fault or faults. Those candidate faults within single intersecting regions 114 represent somewhat less likely, although possible, faults. Those faults within regions of the sets which do not intersect with other sets are even less likely to represent the actual faults, although again, even those faults may represent the actual fault.

With the various fault intersections of FIG. 3, the conventional union method of fault identification yields all faults within all sets, without distinguishing between those which are within regions of intersection with other sets. The conventional intersection method of fault identification yields a null set, since there are no faults common to all of the sets.

However, with the partial intersection method of the invention, described in greater detail below, an intermediate list of candidate faults is generated based on the relative degree of intersection. As noted, faults within region 116 are identified as the most likely faults because those faults have a high degree of intersection. Faults within regions 114 are identified as somewhat less likely faults. Faults which are within non-intersecting portions of the sets are identified as still less likely faults. During fault diagnosis a threshold level is applied to allow selection of only those faults within regions having a predetermined degree of intersection. The threshold level is scaled based on the faults having the highest degree of intersection. For example, a threshold level of 1 is assigned to faults within region 116, whereas a threshold level of 2 is assigned to faults within regions 114. By selecting an intersection threshold of 1, only those faults within region 116 are selected. However, with the threshold set to 2, all faults within regions 114 and 116 are selected. With a threshold set to 3, all faults within all sets are selected. During fault diagnosis, the threshold is adjusted to yield a manageable number of candidate faults. After an examination of gates associated with the candidate faults, if the actual fault is not found, the threshold level is changed to select additional faults, with the process continuing until the actual fault is found. Usually, the actual fault is one within a region having a high degree of intersection. Accordingly, for most applications, it is unnecessary to change the threshold level to select additional faults.

Thus, FIG. 3 illustrates a relatively simple collection of fault sets to which the partial intersection method of the invention may be applied. As can be appreciated, in practical applications, the number of fault sets may be quite large and the relative degree of intersection may likewise be quite large. For example, some candidate faults may lie in a region intersected by 10 or 20 fault sets. Accordingly, the degree of intersection associated with the threshold level of 1 may be quite high.

As will be discussed more fully below, the partial intersection method generally described with reference to FIG. 3 may be applied first to fault sets associated with a single test vector, then applied to fault sets associated with different test vectors, thus yielding a two-level fault identification method. The invention also provides a method for identifying the physical location of the actual gates associated with candidate faults and such method will also be described in detail below.

Figure 4:
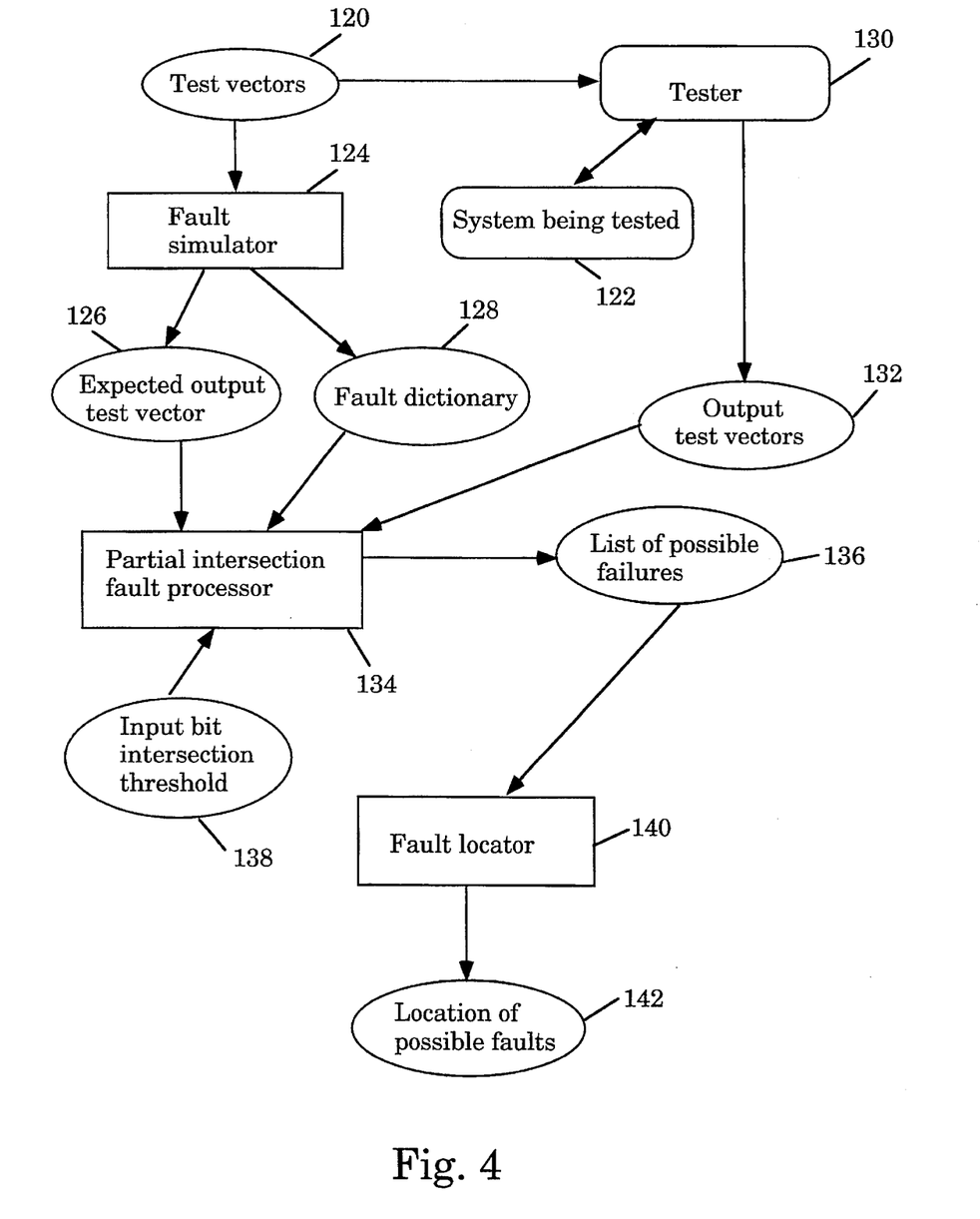
FIG. 4 is a block diagram illustrating the fault diagnosis system of the invention.

FIG. 4 illustrates the overall method and apparatus of the invention. A set of test vectors is defined, in accordance with conventional techniques, for testing a system 122, which may be a chip having an integrated circuit formed thereon. Test vectors 120 are input to a fault simulator 124 which generates a set of output test vectors expected to be generated by system 122 while the system is functioning properly. In FIG. 4, the expected output test vectors are denoted 126. Fault simulator 124 also generates a fault dictionary 128 which relates each candidate fault within system 122 with test bits of test vectors which are likely to be affected if a fault occurs. For example, for each logic gate such as an AND gate within the system, fault simulator 124 generates a list of the test bits of the test vectors which may result in a mismatch if the respective logic gate is defective. Fault simulator 124 may be entirely conventional, at least as far as the generation of the expected test vectors is concerned. However, the fault simulator differs somewhat from conventional fault simulators in that the content and format of the fault dictionary differs. The fault dictionary will be described below.

Test vectors 120 are also input into a tester 130 which controls the actual testing of system 122. More specifically, tester 130 inputs test vectors 120 into system 122 and collects output test vectors 132. Tester 130 may be an entirely conventional JTAG tester which inputs test vectors 120 into system 122 through dedicated JTAG input pins.

Expected output vectors 126, fault dictionary information 128 and output test vectors 132 are input into a partial intersection fault processor 134 which generates a list of candidate faults 136 exceeding a degree of intersection associated with an input threshold level 138. As noted above, the input threshold is selected to achieve a manageable, yet non null list of candidate faults. Initially, the input threshold is set to 1 to select only those faults having the highest degree of intersection (and therefore being the most likely fault candidates.) Then, the threshold level is changed, if necessary, to increase the number of selected candidate faults. In some circumstances, it may be necessary to set the threshold level to effectively emulate the union method to yield a list of all candidate faults associated with all bits.

Once a suitable number of candidate faults have been selected, the list of the candidate faults 136 is input to a fault locator 140 which determines the actual physical location of the faults within system 122. In FIG. 4, the information representing the location of candidate faults is identified by reference numeral 142. For the example, where the system being tested is an integrated circuit formed on a die, the locations of candidate faults are represented as X-Y coordinate locations within the die. Thereafter, test personnel observe the particular locations within the die, perhaps using a microscope, to identify physical signs of failure. In this manner, each of the gates which may be responsible for the mismatched bits are quickly and efficiently examined to identify the actual failing gate. If the identity of the actual failing gate is not determined after examination of all candidate faults within list 136, then the input threshold 138 is changed to select additional candidate faults which are then processed by fault locator 140 to determine their respective physical locations as well. For some applications, it may be necessary to iteratively vary the threshold a number of times until the actual fault or faults are located. If desired, the partial intersection fault processor 134 of FIG. 4 may be configured to output all candidate faults, ordered according to the fault threshold. In such an implementation, all candidate faults are then processed by fault locator 140 to generate a comprehensive list of the locations of all of the candidate faults, ordered accordingly to likelihood of actual failure, based on the varying threshold levels. In such an implementation, it is therefore not necessary to select any particular threshold level then examine only those faults attaining that threshold level. Rather, in such an implementation, all candidate faults are listed, but are ordered according to the degree of intersection, such that test personnel have access to a list of all candidate failures at once.

Hence, FIG. 4 illustrates the overall system of the invention. Within FIG. 4, rectangular blocks generally illustrate software tools. Curved-edged blocks represent hardware, and ovals represent data or blocks of information. However, depending upon the implementation, it may be desirable to implement the software tools, such as the fault simulator or the fault locator, as hard-wired elements. Also, it should be noted that the steps of generating the expected test vectors and the fault dictionary need not be performed for each individual system to be tested, but need be performed once for a particular system design. Thereafter, the expected test vectors and the associated fault dictionary may be reapplied to testing a large number of systems or chips having the corresponding design.

Figure 5:
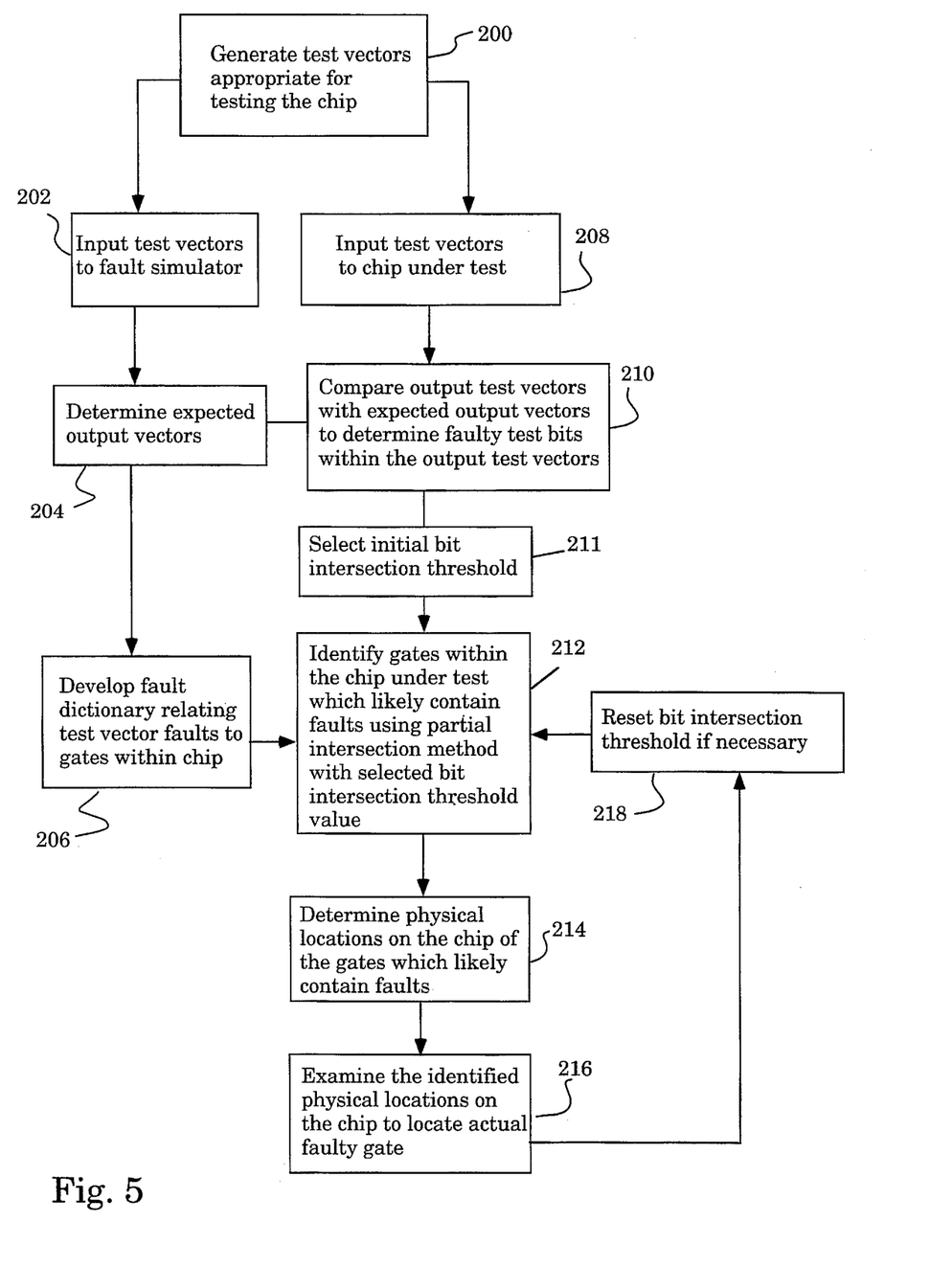
FIG. 5 is a block diagram illustrating the fault diagnosis method employed by the system of FIG. 4.
Figure 6:
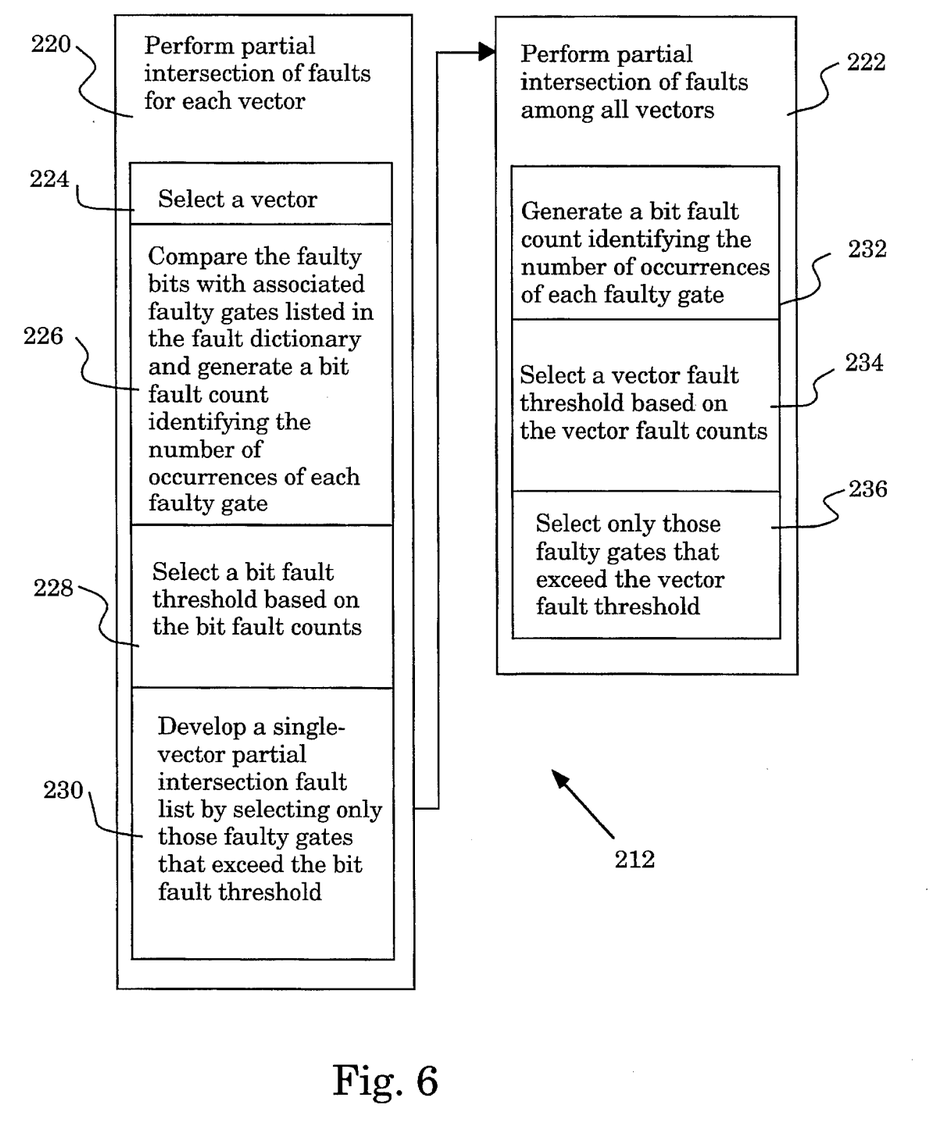
FIG. 6 is a block diagram illustrating the partial intersection identification step of the method of FIG. 5.

With reference to FIGS. 5 and 6, the partial intersection fault identification method performed by fault processor 134 will now be described in greater detail.

FIG. 5 illustrates the method steps employed during fault diagnosis using the system illustrated in FIG. 4. Initially, at 200, test vectors are generated which are appropriate for testing the particular chip or other system being tested. The test vectors are input to a fault simulator, at 202. The fault simulator determines the expected output vectors, at 204, and also develops a fault dictionary which relates the bits of the test vectors to corresponding faults within the chip or other system, at 206.

As noted above, the generation of test vectors and the determination of expected output test vectors may be entirely conventional, and may be provided in accordance with standard JTAG protocol. However, the fault dictionary generated at step 206 differs somewhat from conventional fault dictionaries. Table I illustrates a conventional fault dictionary which relates each candidate fault to those bits which could be affected by the fault.

TABLE I

| Fault ID | Vector-Bit |
|---|---|
| 1 | (1,5),(1,7),(2,5),(2,7) |
| 2 | (1,6),(1,8),(3,7),(4,5) |
| 3 | (2,7),(4,6),(5,1),(6,2) |
| 4 | (1,2),(1,3),(1,4),(1,5) |

Within Table I, each fault ID is a numeric designation associated with a particular candidate fault, such as a flip-flop. The vector-bit values each include a first number which numerically designates the associated test vector and a second number which numerically designates a bit within the test vector.

Table II illustrates a portion of the fault dictionary developed during step 206.

TABLE II

| Vector | Bit | Fault List |
|---|---|---|
| 1 | 1 | 1,2,3,4,7 |
| 1 | 2 | 1,3,5,7 |
| 1 | 3 | 5,7,10,14 |
| 1 | 4 | 5,11,13,14 |
| 1 | 5 | 19,22,25,29 |
| 1 | 6 | 1,2,4,10 |
| 1 | 7 | 5,6,7,8,10 |
| 1 | 8 | 1,3,7,10 |

As can be seen from Table II, the fault dictionary relates each bit of each vector with those faults which could be responsible for a mismatch of that bit. As such, the fault dictionary of Table II essentially represents an inversion of the fault dictionary of Table I. It should be noted that, within the fault dictionary of Table I, not all vector-bit combinations may be represented. Rather, only those vector-bit combinations which are correlated with candidate faults are listed. In the fault dictionary of Table II, all vector-bit combinations are listed. However, for at least some combinations, there will be no associated faults. By ordering the faults according to vector-bit combinations, the determination of the partial intersections is more easily achieved.

Referring again to FIG. 5, the test vectors generated at step 200 are input to the chip or other system being tested, at 208. Output test vectors are compared, at 210, with the expected output vectors generated at step 204 to determine whether any mismatches occur between individual bits.

At 211, an initial threshold value is selected. Typically, the initial threshold value is 1 to thereby enable selection of only those candidate faults having the highest degree of intersection and therefor the greatest likelihood of representing the actual fault. At 212, a list of likely faults is generated based on the threshold intersection value by performing a partial intersection. Thereafter, at 214, the actual physical locations on the chip of the gates which likely contain the faults are determined. At 216, the physical locations are examined for evidence of a physical fault. If no faults are found, an expanded fault list is generated by resetting the threshold, at 218, then repeating steps 212, 214 and 216.

FIG. 6 illustrates the subsets of block 212 of FIG. 5 wherein the partial intersection fault selection is performed.

The partial intersection employs two stages. In the first stage, 220, a partial intersection is performed of fault lists associated with bits within each vector. During a second stage, 222, a partial intersection operation is performed on the individual vector fault lists generated at step 220. In other words, step 220 is performed once for each individual vector to generate sets of fault lists, one per vector. Then, step is performed once to combine all of the individual fault lists into a single list of likely faults.

Within step 220, the partial intersection fault processor sequentially selects each test vector which contains mismatched bits, at 224. Next, at 226, the fault processor generates lists of all faults associated with all mismatched bits, then generates a bit fault count which identifies the number of occurrences of each faulty gate. For example, consider the fault dictionary of Table II wherein each of bits 1–8 are mismatched bits. The fault processor counts the number of occurrences of each fault, then ranks the faults in order of decreasing count and produces lists of faults ordered according to the fault count. A resulting exemplary list of fault counts is illustrated in Table III.

TABLE III

| Fault | Count | Threshold |
|---|---|---|
| 5,7 | 4 | 1 |
| 1,3,10,14 | 2 | 2 |
| 2,4,6,8,11,13 | 1 | 3 |

As can be seen from Table III, faults 5 and 7 both occur four times. Faults 1, 3, 10 and 14 both occur twice. The remaining faults each occur once. The fault counts of Table III corresponds to the degree of intersection described above. In terms of the types of fault sets symbolically illustrated above, faults 5 and 7 occur within regions which are intersected by four fault sets. Faults 1,3,10 and 14 occur within regions intersected by two fault sets. Faults 2,4,6,11 and 13 occur within only one fault set.

Thus, the fault count represents the degree of intersection. As noted above, those faults having the highest fault count are those faults which are most likely to represent the actual fault. Each fault count level is assigned a threshold value ordered in relation to the highest fault count. As can be seen from Table III, threshold level #1 is assigned to the fault count of 4. Threshold level #2 is assigned to the fault count of 2. Threshold level of #3 is assigned to the fault count of 1.

Referring again to FIG. 6, at step 228, a fault threshold is selected, by test personnel, to yield a manageable number of faults. In some circumstances, the threshold is set to #1 to yield only those faults which have the highest degree of intersection. In other cases, the fault threshold may be set to encompass a greater number of candidate faults. A determination of the appropriate threshold may be based upon the total number of faults at each fault count level. For example, if the highest fault count includes only one candidate fault, it may desirable to change the fault threshold to encompass additional faults. However, if the highest fault threshold yields a large number of candidate faults, it may not be necessary to change the threshold to encompass a greater number of faults. After a suitable fault threshold is selected, either by a test operator or by software of the system, a single-vector partial intersection fault list is generated, at 230, which lists only those faults exceeding the bit fault threshold. The process of steps 224–230 is repeated for each vector containing mismatched bits to yield an equal number of single-vector partial intersection fault lists. Typically, the fault threshold is selected independently for each test vector. However, depending upon the implementation, it may be desirable to employ a uniform threshold value for all test vectors.

At 222, the fault lists generated for each individual vector are intersected to yield a single fault list. More specifically, at 232, a vector fault count is generated which identifies the number of occurrences of each fault within all of the fault lists generated at step 230. A vector fault threshold level is selected, at step 234, based on the same criterion as that of step 228, for producing a manageable number of remaining candidate faults. At 236, a list is generated which includes only those candidate faults which exceed the vector fault threshold. The resulting list of candidate faults is processed in accordance with remaining steps of FIG. 5 to determine the actual fault.

Referring again to FIG. 5, the determination of the physical locations on the chip of the gates which are likely to contain faults, at 214, is performed by employing an industry standard X-Y location tool, such as "Dracula" provided by Cadence Design Systems or "Checkmate" provided by Mental Graphics. Such tools provide a comprehensive list of the X-Y locations of each element on the chip. In one implementation, the comprehensive list of gate locations is provided to test personnel along with a list of candidate faulty gates and the test personnel "look up" the X-Y location of the candidate gates, then examine the candidate gates directly. In other implementations, the comprehensive listing of X-Y locations may be automatically merged with the list of candidate faulty gates to provide a listing of only the X-Y locations of the candidate gates. Also, as noted above, in certain implementations it may be desirable to input the X-Y locations generated by the location tool directly into an optical imaging device for controlling the device to sequentially image each gate at each selected physical location, to thereby expedite examination of the candidate faulty gates.

What has been described are methods and apparatus for performing fault diagnosis wherein fault lists are generated based on an intermediate level of intersection between the conventional pure intersection and pure union methods. In accordance with one aspect of the invention, fault lists, which may be generated by the partial intersection method or by conventional methods, is processed by an X-Y location tool which identifies a physical location of the candidate faulty gates. Although exemplary embodiments of the invention have been described herein, such embodiments are merely illustrative of the general principles of the invention which may be applied to a variety of embodiments and in a variety of applications.

What is claimed is:

1. A method for identifying elements of a faulty system, that are likely to contain the faults of the system, based on a set of test vectors output from the system wherein each test vector contains a set of test values, the method comprising the steps of:

comparing the output test vectors with an expected set of output test vectors to identify faulty test values, with any differences between the output test vectors and corresponding expected test vectors indicating a failure of the test and indicating that at least one element of the system is faulty;

identifying a set of candidate faulty elements for each of the faulty test values; and identifying elements of the system that are likely to contain the faults of the system by performing a partial intersection on the sets of candidate faulty elements wherein only elements associated with at least a predetermined number of faulty test values are selected.

2. The method of claim 1, wherein the system is a circuit formed on a chip, the elements of the system are logic gates, and the test values are test bits.

3. The method of claim 1, wherein said step of identifying elements that are likely to contain faults by performing a partial intersection on the sets of candidate faulty elements comprises the steps of:

selecting a threshold fault count;

determining a fault count for each candidate faulty element, said fault count being representative of the number of occurrences of each respective faulty element within all sets of candidate faulty elements associated with all faulty values; and identifying all elements which have a fault count greater than the selected threshold fault count as the elements likely to contain faults.

4. The method of claim 3, wherein said selected threshold fault count identifies the threshold in relation to a fault count having a highest degree of intersection.

5. The method of claim 3, wherein the steps of determining a fault count for each candidate faulty element and identifying all elements which have a fault count greater than the selected threshold are first performed on faults associated with individual test vectors then performed on faults associated with different test vectors.

6. An apparatus for identifying elements of a faulty system, that are likely to contain the faults of the system, based on a set of test vectors output from the system wherein each test vector contains a set of test values, the apparatus comprising:

a device for comparing the output test vectors with an expected set of output test vectors to identify faulty test values, with any differences between the output test vectors and corresponding expected test vectors indicating a failure of the test and indicating that at least one element of the system is faulty;

a device for identifying a set of candidate faulty elements for each of the faulty test values; and a device for identifying elements of the system that are likely to contain faults by performing a partial intersection on the sets of candidate faulty elements wherein only elements associated with at least a predetermined number of faulty test values are selected.

7. The apparatus of claim 6, wherein the system is a circuit formed on a chip, the elements of the system are logic gates, and the test values are test bits.

8. The apparatus of claim 6, wherein said device for identifying elements likely to contain faults by performing a partial intersection on the sets of candidate faulty elements comprises:

a device for selecting a threshold fault count;

a device for determining a fault count for each candidate faulty element, said fault count being representative of the number of occurrences of each respective faulty element within all sets of candidate faulty elements associated with all faulty values; and a device for identifying all elements which have a fault count greater than the selected threshold fault count as the elements likely to contain faults.

9. The apparatus of claim 8, wherein said selected threshold fault count identifies the threshold in relation to a fault count having a highest degree of intersection.

10. The apparatus of claim 8, wherein the devices for determining a fault count for each candidate faulty element and for identifying all elements which have a fault count greater than the selected threshold operate on faults associated with individual test vectors then on faults associated with different test vectors.

11. A method for identifying elements of a faulty system, that are likely to contain the faults of the system, based on a set of test vectors output from the system wherein each test vector contains a set of test values, the method comprising the steps of:

providing a device for comparing the output test vectors with an expected set of output test vectors to identify faulty test values, with any differences between the output test vectors and corresponding expected test vectors indicating a failure of the test and indicating that at least one element of the system is faulty;

providing a device for identifying a set of candidate faulty elements for each of the faulty test values; and providing a device for identifying elements of the system that are likely to contain faults by performing a partial intersection on the sets of candidate faulty elements wherein only elements associated with at least a predetermined number of faulty test values are selected.

12. The method of claim 11, wherein the system is a circuit formed on a chip, the elements of the system are logic gates, and the test values are test bits.

13. The method of claim 11, wherein said step of providing a device for identifying elements likely to contain faults by performing a partial intersection on the sets of candidate faulty elements comprises the steps of:

providing a device for selecting a threshold fault count;

providing a device for determining a fault count for each candidate faulty element, said fault count being representative of the number of occurrences of each respective faulty element within all sets of candidate faulty elements associated with all faulty values; and providing a device for identifying all elements which have a fault count greater than the selected threshold fault count as the elements likely to contain faults.

14. The method of claim 13, wherein said selected threshold fault count identifies the threshold in relation to a fault count having a highest degree of intersection.

15. The method of claim 13, wherein the devices for determining a fault count for each candidate faulty element and for identifying all elements which have a fault count greater than the selected threshold operate on faults associated with individual test vectors then on faults associated with different test vectors.

16. A test method for testing an electronic system provided on a chip and having a plurality of elements, said method comprising the steps of:

receiving a set of test vectors output from the system;

comparing the output test vectors with an expected set of output test vectors to identify faulty test values, with any differences between the output test vectors and corresponding expected test vectors indicating a failure of the test and indicating that at least one element of the system is faulty;

identifying a set of candidate faulty elements for each of the faulty test values; and identifying elements of the system that are likely to contain faults based on the sets of candidate faulty elements by performing a partial intersection on the sets of candidate faulty element associated with faulty test values wherein only elements which are associated with at least a predetermined number of faulty values are selected; and determining the physical location of the elements likely to contain faults within the chip by employing a software tool capable of identifying the location on a chip of one or more elements.

17. The method of claim 16, wherein the system is a circuit formed on a chip, the elements of the system are logic gates, and the test values are test bits.

18. The method of claim 16, wherein the step of performing a partial intersection on the sets of candidate faulty elements comprises the steps of:

selecting a threshold fault count;

determining a fault count for each candidate faulty element, said fault count being representative of the number of occurrences of each respective faulty element within all sets of candidate faulty elements associated with all faulty values; and identifying all elements which have a fault count greater than the selected threshold fault count as the elements likely to contain faults.

19. The method of claim 18, wherein said selected threshold fault count identifies the threshold in relation to a fault count having a highest degree of intersection.

20. The method of claim 18, wherein the steps of determining a fault count for each candidate faulty element and identifying all elements which have a fault count greater than the selected threshold are first performed on faults associated with individual test vectors then performed on faults associated with different test vectors.

21. A test apparatus for testing an electronic system provided on a chip and having a plurality of elements, said apparatus comprising:

a device for receiving a set of test vectors output from the system;

a device for comparing the output test vectors with an expected set of output test vectors to identify faulty test values, with any differences between the output test vectors and corresponding expected test vectors indicating a failure of the test and indicating that at least one element of the system is faulty;

a device for identifying a set of candidate faulty elements for each of the faulty test values; and a device for identifying elements of the system that are likely to contain faults based on the sets of candidate faulty elements by performing a partial intersection on the sets of candidate faulty elements associate with faulty test values wherein only elements which are associated with at least a predetermined number of faulty values are selected; and a device for determining the physical location of the elements likely to contain faults within the chip by employing a software tool capable of identifying the location on a chip of one or more elements.

22. The apparatus of claim 21, wherein the system is a circuit formed on a chip, the elements of the system are logic gates, and the test values are test bits.

23. The apparatus of claim 21, wherein the device for performing a partial intersection on the sets of candidate faulty elements comprises:

a device for selecting a threshold fault count;

a device for determining a fault count for each candidate faulty element, said fault count being representative of the number of occurrences of each respective faulty element within all sets of candidate faulty elements associated with all faulty values; and a device for identifying all elements which have a fault count greater than the selected threshold fault count as the elements likely to contain faults.

24. The apparatus of claim 21, wherein said selected threshold fault count identifies the threshold in relation to a fault count having a highest degree of intersection.

25. The apparatus of claim 21, wherein the devices for determining a fault count for each candidate faulty element and identifying all elements which have a fault count greater than the selected threshold are first performed on faults associated with individual test vectors then performed on faults associated with different test vectors.

26. A method for testing an electronic system provided on a chip and having a plurality of elements, said method comprising the steps of:

providing a device for receiving a set of test vectors output from the system;

providing a device for comparing the output test vectors with an expected set of output test vectors to identify faulty test values, with any differences between the output test vectors and corresponding expected test vectors indicating a failure of the test and indicating that at least one element of the system is faulty;

providing a device for identifying a set of candidate faulty elements for each of the faulty test values; and providing a device for identifying elements of the system that are likely to contain faults based on the sets of candidate faulty elements by performing a partial intersection on the sets of candidate faulty elements associated with faulty test values wherein only elements which are associated with at least a predetermined number of faulty values are selected; and providing a device for determining the physical location of the elements likely to contain faults within the chip by employing a software tool capable of identifying the location on a chip of one or more elements.

27. The method of claim 26, wherein the system is a circuit formed on a chip, the elements of the system are logic gates, and the test values are test bits.

28. The method of claim 26, wherein the steps of providing a device for performing a partial intersection on the sets of candidate faulty elements comprises the steps of:

providing a device for selecting a threshold fault count;

providing a device for determining a fault count for each candidate faulty element, said fault count being representative of the number of occurrences of each respective faulty element within all sets of candidate faulty elements associated with all faulty values; and providing a device for identifying all elements which have a fault count greater than the selected threshold fault count as the elements likely to contain faults.

29. The method of claim 26, wherein said selected threshold fault count identifies the threshold in relation to a fault count having a highest degree of intersection.

30. The method of claim 28, wherein the devices for determining a fault count for each candidate faulty element and identifying all elements which have a fault count greater than the selected threshold are first performed on faults associated with individual test vectors then performed on faults associated with different test vectors.

* * * * *